US008166333B2

(12) United States Patent
Huang et al.

(10) Patent No.: US 8,166,333 B2
(45) Date of Patent: Apr. 24, 2012

(54) NETWORK SIGNAL PROCESSING APPARATUS

(75) Inventors: Liang-Wei Huang, Taipei (TW);
Chih-Yung Shih, Taipei (TW);
Shieh-Hsing Kuo, Taipei County (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 588 days.

(21) Appl. No.: 12/364,530

(22) Filed: Feb. 3, 2009

(65) Prior Publication Data
US 2009/0199035 A1 Aug. 6, 2009

(30) Foreign Application Priority Data

Feb. 4, 2008 (TW) ................................ 97104194 A

(51) Int. Cl.
*G06F 1/12* (2006.01)
(52) U.S. Cl. .......................... 713/400; 713/500; 375/232
(58) Field of Classification Search .................. 713/375, 713/400, 500; 375/220, 232, 370, 372; 360/46, 360/51, 65
See application file for complete search history.

(56) References Cited

U.S. PATENT DOCUMENTS

| | | | | | |
|---|---|---|---|---|---|
| 5,539,739 | A * | 7/1996 | Dike et al. | ...................... | 370/352 |
| 6,075,830 | A * | 6/2000 | Piirainen | ........................ | 375/354 |
| 6,308,229 | B1 * | 10/2001 | Masteller | ......................... | 710/52 |
| 6,487,672 | B1 | 11/2002 | Byrne et al. | | |
| 6,560,716 | B1 | 5/2003 | Gasparik | | |
| 6,762,630 | B2 * | 7/2004 | Fibranz et al. | ................. | 327/141 |
| 6,848,060 | B2 * | 1/2005 | Cook et al. | ..................... | 713/400 |
| 6,961,863 | B2 * | 11/2005 | Davies et al. | .................. | 713/500 |
| 7,394,608 | B2 * | 7/2008 | Eleftheriou et al. | ............ | 360/65 |
| 7,395,450 | B2 * | 7/2008 | Karaki | ........................... | 713/600 |
| 7,433,142 | B2 * | 10/2008 | Bui et al. | .......................... | 360/46 |
| 7,522,367 | B2 * | 4/2009 | Eleftheriou et al. | ............ | 360/65 |
| 7,596,176 | B2 * | 9/2009 | Eleftheriou et al. | ........... | 375/232 |
| 7,739,628 | B2 * | 6/2010 | Manohar et al. | ............... | 716/103 |
| 7,900,078 | B1 * | 3/2011 | Manohar et al. | ............... | 713/375 |
| 2007/0047121 | A1 | 3/2007 | Eleftheriou et al. | | |
| 2007/0098061 | A1 | 5/2007 | Eleftheriou | | |

OTHER PUBLICATIONS

Stein, Mike. Crossing the abyss: asynchronous signals in a synchronous world. EDN. Jul. 24, 2003.*
Rajakumari et al. A Novel Approach to Reduce Leakage Power in GALS System architectures. International Journal of Computer Applications. vol. 36. No. 5. Dec. 2011.*
Chattopadhyay et al. GALDS: A Complete Framework for Designing Multiclock ASICs and SoCs. IEEE Transactions on Very Large Scale Integration (VLSI) Systems. vol. 13. No. 6. Jun. 2005.*

* cited by examiner

*Primary Examiner* — Matthew Spittle
(74) *Attorney, Agent, or Firm* — Winston Hsu; Scott Margo

(57) ABSTRACT

A network signal processing circuit includes a first signal processing module, a first sampling rate converter, a second signal processing module, a second sampling rate converter and a timing controller. The first signal processing module is utilized for processing a network signal to output a first processed signal. The first sampling rate converter is utilized for performing signal frequency conversion on the first processed signal according to a first clock timing adjusting signal and outputting a first converted signal. The second signal processing module is utilized for processing the first converted signal to output a second processed signal. The second sampling rate converter is utilized for performing signal frequency conversion on the second processed signal according to a second clock timing adjusting signal and outputting a second converted signal. The timing controller is utilized for generating the first and second clock timing adjusting signals.

15 Claims, 2 Drawing Sheets

NETWORK SIGNAL PROCESSING APPARATUS

BACKGROUND OF THE INVENTION

1. Field of the Invention

The present invention relates to a network signal processing apparatus, and more particularly, to a network signal processing apparatus comprising a first sampling rate converter, a second sampling rate converter, and a timing controller, wherein the first and the second sampling rate converters respectively perform signal frequency conversion on signals in a synchronous domain and in an asynchronous domain according to a first timing adjustment signal and a second timing adjustment signal generated by the timing controller in order that the signals in a synchronous domain and in an asynchronous domain have the different operation frequency, respectively.

2. Description of the Prior Art

Generally speaking, a transmitter (TX) and a receiver (RX) in a communication system deliver signals in a synchronous way while the TX transmits signals and the RX receives signals. In practice, it is required to design a clock generator in the RX for generating a clock signal and to analyze the received signal to perform phase adjustment on the clock signal until the clock signal of the RX locks the clock signal of the TX, so as to complete the clock synchronization.

However, it is required to constantly adjust the phase of the clock signal of the RX for the purpose of tracking the clock signal of the TX. Therefore, repeatedly performing operations for converging some values calculated by the system may be required due to the unstable phase, and that could cause the overall system efficiency to be greatly reduced.

SUMMARY OF THE INVENTION

It is therefore an objective of the present invention to provide a network signal processing apparatus comprising a first sampling rate converter and a second sampling rate converter that make signals converted from an asynchronous domain to a synchronous domain, or from a synchronous domain to an asynchronous domain so that utilize at least one signal in a synchronous domain to control at least one device in an asynchronous domain.

According to an embodiment of the present invention, a network signal processing apparatus is disclosed. The network signal processing apparatus comprises: a first signal processing module, a first sampling rate converter, a second signal processing module, a second sampling rate converter, and a timing controller. The first signal processing module is operated in an asynchronous domain and is utilized for processing a network signal to output a first processed signal. The first sampling rate converter is coupled to the first signal processing module, and is utilized for performing signal frequency conversion on the first processed signal according to a first timing adjustment signal and outputting a first converted signal. The second signal processing module, which is operated in a synchronous domain and is further coupled to the first sampling rate converter, is utilized for processing the first converted signal to output a second processed signal. The second sampling rate converter is coupled between the first signal processing module and the second signal processing module, and is utilized for performing signal frequency conversion on the second processed signal according to a second timing adjustment signal and outputting a second converted signal to the first signal processing module. And the timing controller is coupled to the first and the second sampling rate converters, and is utilized for generating the first timing adjustment signal to the first sampling rate converter and generating the second timing adjustment signal to the second sampling rate converter so as to adjust the timing of both the first and the second converted signals.

According to an embodiment of the present invention, a network signal processing apparatus is also disclosed. The network signal processing apparatus comprises: a first signal processing module, a sampling rate converter, a second signal processing module, and a timing controller. The first signal processing module is operated in an asynchronous domain, and is utilized for processing a network signal to output a first processed signal. The sampling rate converter is coupled to the first signal processing module, and is utilized for performing signal frequency conversion on the first processed signal according to a timing adjustment signal and outputting a converted signal. A second signal processing module, which is operated in a synchronous domain and is further coupled to the sampling rate converter, is utilized for processing the converted signal to output a second processed signal. A timing controller is coupled to the second signal processing module, and is utilized for generating the timing adjustment signal according to the second processed signal so as to adjust the timing of the converted signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
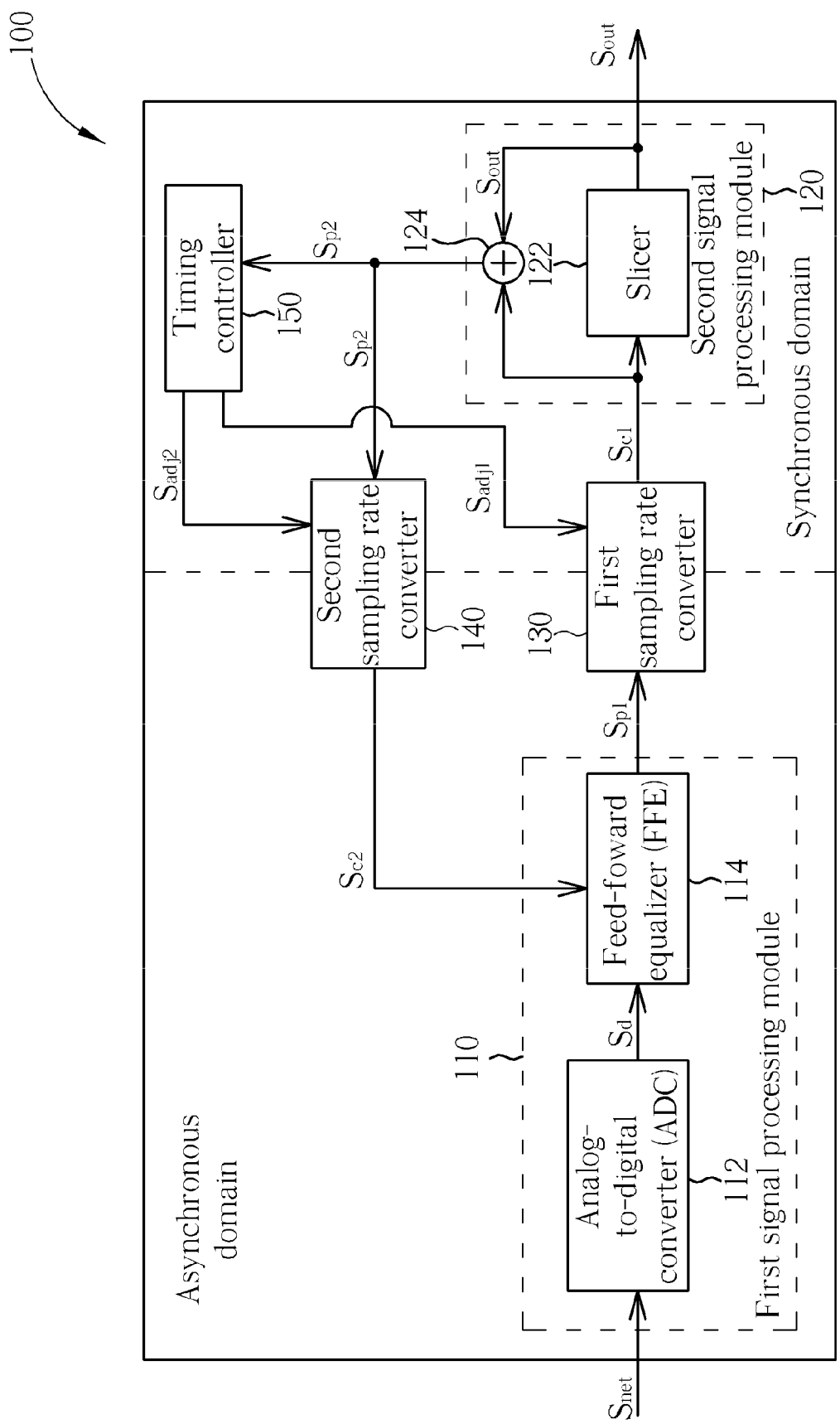
FIG. 1 is a diagram of a network signal processing apparatus according to a preferred embodiment of the present invention.

Please refer to FIG. 1. FIG. 1 is a diagram of a network signal processing according to a preferred embodiment of the present invention. As shown in FIG. 1, the network signal processing apparatus 100 comprises: a first signal processing module 110 operated in an asynchronous domain; a second signal processing module 120 operated in a synchronous domain; a first sampling rate converter 130; a second sampling rate converter 140; and a timing controller 150. In order to make the concept of the present invention easily appreciable, suppose that, in this embodiment, the network signal processing apparatus 100 is installed in a 10G Base-T Ethernet receiver, and the symbol rate of signal transmission is 800 MHz according to the specifications of 10G Base-T Ethernet. However, this is intended for illustrative purposes only, and is not meant to be a limitation of the present invention. That is, the circuit structure disclosed by the present invention can be implemented within other device(s) in accordance with different requirements according to variations of this embodiment. The first signal processing module 110 of the network signal processing 100 operates in an asynchronous domain and is always operated at 1 GHz. However, this is intended for illustrative purpose only, and is not meant to be a limitation of the present invention. Any operation frequency above the symbol rate (800 MHz) is also applicable, such as 900 MHz or 950 MHz. The second signal processing 120 and the timing controller 150 operate in a synchronous domain, and are both operated at 800 MHz (i.e. the symbol rate in this embodiment). Hereinafter, the operations of the network signal processing apparatus 100 will be explained in more detail. However, this is intended for illustrative purposes only, and is not meant to be a limitation of the present invention.

First, please refer to the first signal processing module 110 shown in FIG. 1. The first signal processing module 110 implemented according to an embodiment of the present invention comprises: an analog-to-digital converter (ADC) 112 and a feed-forward equalizer (FFE) 114, wherein the FFE 114 is coupled to the ADC 112, the first sampling rate converter 130, and the second sampling rate converter 140. The ADC 112 performs signal frequency conversion on a network signal Snet with a sampling rate of 1 GHz to output a digital signal Sd, and then the FFE 114 equalizes the digital signal Sd to output a first processed signal Sp1, and outputs the first processed signal Sp1 to the first sampling rate converter 130.

As shown in FIG. 1, the first sampling rate converter 130 is coupled between the first signal processing module 110 and the second signal processing module 120, and is utilized for performing signal frequency conversion on the first processed signal Sp1 according to the first timing adjustment signal Sadj1 generated by the timing controller 150 and outputting a first converted signal Sc1 accordingly. As the first signal processing module 110 operates in an asynchronous domain (where the symbol rate is 1 GHz) and as the second signal processing module 120 operates in a synchronous domain, the first processed signal Sp1 whose frequency is 1 GHz needs to be converted into the first converted signal Sc1 whose frequency is 800 MHz by the first sampling rate converter 130 so that the second signal processing module 120 can properly process the first converted signal Sc1. According to an embodiment of the present invention, the first sampling rate converter 130 can be implemented by utilizing an interpolator, where the interpolator can perform interpolation on the first processed signal Sp1 according to a timing adjustment signal Sadj1 generated by the timing controller 150, in order to generate and output the first converted signal Sc1 to the second signal processing module 120.

Please refer to the second signal processing module 120 shown in FIG. 1. The second signal processing module 120 implemented according to an embodiment of the present invention comprises: a silcer 122, and an adder 124, wherein the silcer 122 slices the first converted signal Sc1 to generate a sliced signal Sout, and outputs the sliced signal Sout to the next stage to perform the subsequent process. Besides, the adder 124 performs operations on the input and output signals of the silcer 122 (i.e. the first converted signal Sc1 and the sliced signal Sout, respectively) to generate a second processed signal Sp2 in order to adjust the operations of the feed-forward equalizer (FFE) 114. For example, the adder is utilized for performing subtraction operations to calculate the difference between the first converted signal Sc1 and the sliced signal Sout in order to generate the second processed signal Sp2. Regarding this embodiment, the second processed signal Sp2 is an error signal, that is to say, the value of the error signal can be obtained by subtracting the input signal from the output signal of the silcer 122, and the error signal is feedback to the FFE 114. As a result, the FFE 114 can equalize the digital signal Sd according to the error signal and output a first processed signal Sp1.

As shown in FIG. 1, the second sampling rate converter 140 is coupled between the first signal processing module 110 and the second signal processing module 120, and is utilized for performing signal frequency conversion on the second processed signal Sp2 according to the second timing adjustment signal Sadj2 generated by the timing controller 150 and outputting a second converted signal Sc2 accordingly. Similarly, as the second signal processing module 120 operates in a synchronous domain (where the symbol rate is 800 MHz) and as the FFE 114 of first signal processing module 110 operates in an asynchronous domain, the second processed signal Sp2 with 800 MHz frequency needs to be converted into the second converted signal Sc2 with 1 GHz frequency by the second sampling rate converter 140 so that the FFE 114 can properly adjust its operations according to the second converted signal Sc2. According to an embodiment of the present invention, the second sampling rate converter 140 can be implemented by utilizing an interpolator, where the interpolator can perform interpolation on the second processed signal Sp2 according to the second timing adjustment signal Sadj2 generated by the timing controller 150 to generate and output the second converted signal Sc2 to the first signal processing module 110.

Please refer to FIG. 1 once again. The timing controller 150 is coupled to the first sampling rate converter 130 and coupled between the second sampling rate converter 140 and the second signal processing module 120, wherein the timing controller 150 generates both the first and the second timing adjustment signals Sadj1 and Sadj2 according to the second processed signal Sp2. The first sampling rate converter 130 determines the time step of interpolation for the first processed signal Sp1 according to the first timing adjustment signal Sadj1. The second sampling rate converter 140 determines the time step of interpolation for the second processed signal Sp2 according to the second timing adjustment Sadj2.

Figure 2:
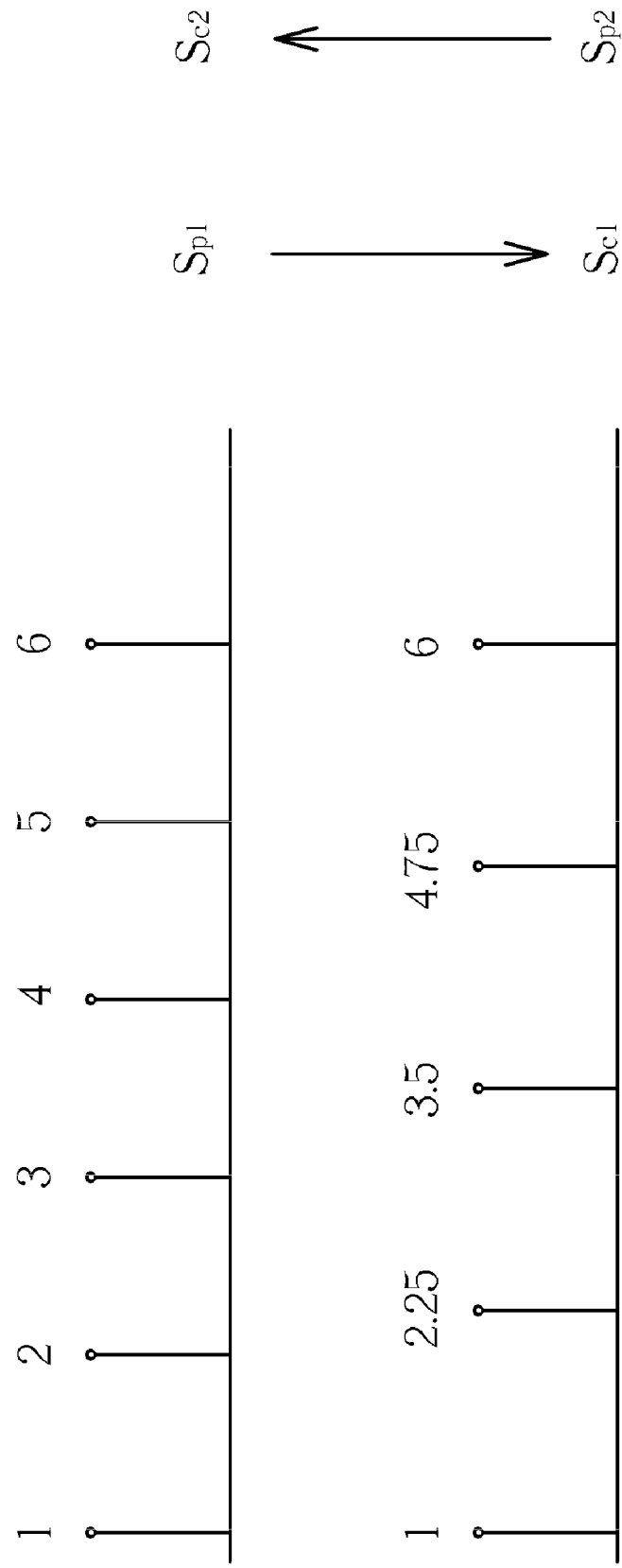
FIG. 2 is a diagram of the relative time step of the first processed signal, the first converted signal, the second processed signal, and the second converted signals.

Please refer to FIG. 2. FIG. 2 is a diagram illustrating the relative time steps of the first processed signal Sp1, the first converted signal Sc1, the second processed signal Sp2, and the second converted signal Sc2. Since the first processed signal Sp1 and the second converted signal Sc2 are both clocked at 1 GHz, and the first converted signal Sc1 and the second processed signal Sp2 are both clocked at 800 MHz, the first sampling rate converter 130 converts the first processed signal Sp1 into the first converted signal Sc1 having a time step of 1.25 units if the time step of the first processed signal Sp1 being set as 1 unit. Moreover, since the signal frequency will not be changed after processed by the second signal processing module 120, the time step of second processed signal Sp2 is still 1.25 units, and the time step of the second converted signal Sc2 converted from the second processed signal Sp2 by the second sampling rate converter 140 should be recovered to 1 unit. Please note that, since the detailed operations about how the first sampling rate converter 130 converts the signal frequency from 800 MHz into 1 GHz and how the second sampling rate converter 140 converts the signal frequency from 1 GHz into 800 MHz are well known to those skilled in the art, further descriptions are omitted here for the sake of brevity.

It should be noted that problems such as frequency offset or phase offset are not considered in the above-mentioned embodiments. If the frequency offset or phase offset problems need to be considered, the timing controller can provide a compensation quantity via the timing adjustment signal to compensate the sampling rate converter dynamically. It is assumed that the first sampling rate converter 130 and the second sampling rate converter 140 are both interpolators and the frequency conversion is performed by means of interpolation. According to a compensation amount Offset provided through the first timing adjustment signal Sadj1, the timing controller 150 controls the time step of the interpolation that the first sampling rate converter 130 performs on the first processed signal Sp1, in order to compensate the first sampling rate converter 130 dynamically. Similarly, According to a compensation amount Offset provided through the second timing adjustment signal Sadj2, the timing controller 150 controls the time step of the interpolation that the first sampling rate converter 130 performs on the second processed signal Sp2, in order to compensate the second sampling rate converter 140 dynamically, so as to make the timing of second converted signal Sc2 substantially equal to the timing of first processed signal Sp1. For example, the time step of the interpolation performed by the first sampling rate converter 130 is fixed at 1.25 units when the frequency offset or the phase offset problems are not considered; nevertheless, when the frequency offset or the phase offset problems are considered, the time step of the interpolation performed by the first sampling rate converter 130 will become equal to (1.25+Offset) units. Moreover, the methods of dynamic compensation can be further divided into the methods utilizing a phase-locked loop (PLL) and the methods utilizing a voltage controlled oscillator (VCO). When the method utilizing a PLL is applied, only some of the time steps are equal to (1.25+Offset) units, while the others are still fixed at 1.25 units, wherein the compensation amount Offset is a constant value. When the method utilizing a VCO is applied, all the time steps are equal to (1.25+Offset) units, and the timing controller 150 is continuously updating the value of the compensation amount Offset. Please note that since the detailed operations and apparatus about how to use the PLL and the VCO to compensate the time step are well known to those skilled in the art, further description is omitted here for the sake of brevity.

Those skilled in the art will readily observe that numerous modifications and alterations of the device and method may be made while retaining the teachings of the invention. Accordingly, the above disclosure should be construed as limited only by the metes and bounds of the appended claims.

Those skilled in the art will readily observe that numerous modifications and alterations of the device and method may be made while retaining the teachings of the invention.

What is claimed is:

1. A network signal processing apparatus comprising:
   a first signal processing module operated in an asynchronous domain, wherein the first signal processing module is utilized for processing a network signal to output a first processed signal;
   a first sampling rate converter coupled to the first signal processing module, wherein the first sampling rate converter is utilized for performing signal frequency conversion on the first processed signal according to a first timing adjustment signal and outputting a first converted signal;
   a second signal processing module operated in a synchronous domain and coupled to the first sampling rate converter, wherein the second signal processing module is utilized for processing the first converted signal to output a second processed signal;
   a second sampling rate converter, coupled between the first signal processing module and the second signal processing module, for performing signal frequency conversion on the second processed signal according to a second timing adjustment signal and outputting a second converted signal to the first signal processing module; and
   a timing controller, coupled to the first and the second sampling rate converters, for generating the first timing adjustment signal to the first sampling rate converter and generating the second timing adjustment signal to the second sampling rate converter so as to adjust the timing of both the first and the second converted signal, wherein the timing controller outputs the first and the second timing adjustment signals according to the second processed signal.

2. The network signal processing apparatus of claim 1, wherein the first signal processing module comprises:
   an analog-to-digital converter (ADC) for performing analog-to-digital conversion on the network signal to output a digital signal; and
   a feed-forward equalizer, coupled to the ADC, for equalizing the digital signal to output the first processed signal.

3. The network signal processing apparatus of claim 1, wherein the second signal processing module comprises:
   a silcer for slicing the first converted signal to output a sliced signal; and
   an arithmetic unit, coupled to the silcer, for performing operations on the first converted signal and the sliced signal to output the second processed signal.

4. The network signal processing apparatus of claim 1, wherein the second processed signal is an error signal.

5. The network signal processing apparatus of claim 1, wherein each of the first and the second sampling rate converters is an interpolator.

6. The network signal processing apparatus of claim 5, wherein the first sampling rate converter determines the time step of the interpolation for the first processed signal according to the first timing adjustment signal, and the second sampling rate converter determines the time step of the interpolation for the second processed signal according to the second timing adjustment signal.

7. The network signal processing apparatus of claim 5, wherein the timing controller dynamically compensates each of the time steps of the interpolation of the first sampling rate converter, and dynamically compensates each of the time steps of the interpolation of the second sampling rate converter.

8. The network signal processing apparatus of claim 1, wherein the network signal processing apparatus is installed in an Ethernet system.

9. The network signal processing apparatus of claim 1, wherein the first signal processing module comprises:
   an ADC for performing analog-to-digital conversion on the network signal to output a digital signal; and
   a feed-forward equalizer, coupled to the ADC, for equalizing the digital signal to output the first processed signal.

10. The Network signal processing apparatus of claim 1, wherein the second signal processing module comprises:
    a silcer for slicing the converted signal to output a sliced signal; and
    an arithmetic unit, coupled to the silcer, for performing operations on the converted and the sliced signals to output the second processed signal.

11. The network signal processing apparatus of claim 1, wherein the second processed signal is an error signal.

12. The network signal processing apparatus of claim 1, wherein the sampling rate converter is an interpolator.

13. The network signal processing apparatus of claim 12, wherein the sampling rate converter determines the time step of interpolation for the first processed signal according to the timing adjustment signal.

14. The network signal processing apparatus of claim 1, wherein the network signal processing apparatus is installed in an Ethernet system.

15. A network signal processing apparatus, comprising:
- a first signal processing module operated in an asynchronous domain, wherein the first signal processing module is utilized for processing a network signal to output a first processed signal;
- a sampling rate converter coupled to the first signal processing module, wherein the sampling rate converter is utilized for performing signal frequency conversion on the first processed signal according to a timing adjustment signal and outputting a converted signal;
- a second signal processing module operated in a synchronous domain, wherein the second signal processing module is utilized for processing the converted signal to output a second processed signal; and
- a timing controller, coupled to the second processing module, for generating the timing adjustment signal according to the second processed signal so as to adjust the timing of the converted signal.

* * * * *